United States Patent [19]

Wachspress

[11] Patent Number: 4,770,945
[45] Date of Patent: Sep. 13, 1988

[54] SCULPTURE AND METHOD FOR CONSTRUCTING

[75] Inventor: Eugene L. Wachspress, Knoxville, Tenn.

[73] Assignee: University of Tennessee Research Corporation, Knoxville, Tenn.

[21] Appl. No.: 60,728

[22] Filed: Jun. 10, 1987

[51] Int. Cl.[4] .......................................... A63H 33/16
[52] U.S. Cl. ................................ 428/542.2; 428/542.4
[58] Field of Search ............. 428/74, 542.2, 52, 542.4, 428/542.8, 7, 9, 5; 434/82, 403, 211; 156/59, 61; 5/479

[56] References Cited

U.S. PATENT DOCUMENTS

| 3,117,384 | 1/1964 | Billis | 428/7 X |
|---|---|---|---|
| 3,196,061 | 7/1965 | Paulson et al. | 428/5 X |
| 3,302,231 | 2/1967 | Walker | 46/1 |
| 3,469,882 | 9/1969 | Larsen | 5/419 X |
| 3,749,636 | 7/1973 | Tranquillitsky | 428/52 X |
| 3,895,229 | 7/1975 | Serom | 428/542.2 X |
| 4,033,068 | 7/1977 | Skillman | 428/542.2 X |
| 4,462,145 | 7/1984 | Schulze | 428/7 X |
| 4,492,723 | 1/1985 | Chadwick | 428/9 X |
| 4,511,630 | 4/1985 | Kalmein | 428/542.2 |

Primary Examiner—Nancy A. B. Swisher
Attorney, Agent, or Firm—Luedeka, Hodges & Neely

[57] ABSTRACT

A sculpture is constructed by defining a seed having a plurality of algebraic in which the sum (M) of the orders of the surfaces is five or greater and having a plurality of edges at the intersection of the surfaces. The seed is physically modeled and the edges of the seed model are extended into space in accordance with the algebraic equations that define them. All intersection points of the edge extensions are determined and at least one rod is extended from the seed model along at least one of the edge extensions for a predetermined distance. Then, a unique algebraic adjoint surface having a maximal order of M-4 and including all of the intersection points is determined and physically modeled. The combination of the seed, at least one rod and the adjoint surface model comprises the sculpture.

2 Claims, 1 Drawing Sheet

SCULPTURE AND METHOD FOR CONSTRUCTING

FIELD OF INVENTION

The present invention relates to sculptures and methods for constructing the same, and particularly relates to a sculpture that is generated by a seed structure.

BACKGROUND AND SUMMARY

Sculptures are often used to set a mood or define the character of particular area. For example, theme sculptures are often used as a center of focus in parks, building plazas, atriums and similar locations. Each such sculpture is normally generated by an artist for a particular situation, and the artist's concept of the desired mood or theme may be quite different from that which is perceived by the sponsor or owner of the work. Thus, a sponsor may be disappointed in a work or feel that his input has been ignored.

The present invention provides a sculpture and a means for designing a sculpture that provides a logical nexus between a theme and a sculpture. This nexus is accomplished by generating a sculpture from a seed structure, and the seed may be selected to embody the desired theme. For example, a sculpture designed for the plaza of an office tower may use the shape of the tower as a seed from which a sculpture is generated. Since the seed or parts thereof remain as a portion of the sculpture, the theme of the seed (such as the tower) is necessarily carried forward in the sculpture. In such case, the sponsor of a sculpture and the casual observer will be able to recognize the theme of the seed, such as a tower, that is continued and amplified in the sculpture. As more fully described below, however, the artist remains free to choose the precise manner of expression of the sculpture within certain confines of the present method.

In accordance with the present invention, a method is disclosed for producing a sculpture that has three component types, namely, a seed, edge extensions or rods, and an adjoint surface. First, a seed is defined in the form of any polyhedron which for present purposes may be defined as a three dimensional volume bounded by algebraically defined surfaces. That is, the surfaces of the seed are defined by algebraic equations.

Next, rods are formed along edge extensions of the seed. The edge extensions are defined by the seed and, more particularly, are defined by the edges of the seed. Since the surfaces that bound the seed are defined algebraically, the surfaces will intersect along edges which are also defined by algebraic equations. To determine the position of the rods, the algebraic equations that define the edges are used to extend the edges beyond the seed and, thus, define rod positions (edge extensions) extending in space from the seed. Some of these edge extensions may be infinite in length and the artist must terminate the rods that extend along the edge extensions at a selected length. In other cases, the edge extensions will be a closed configuration such as a circle or an ellipse. In such case, the artist, if he chooses, may provide rods that extend for the entire distance of the edge extensions.

Finally, an adjoint surface is defined and modeled in space. The adjoint surface is defined by the seed and the edge extensions. One might expect, that with space being so large, it would be rare for the aforementioned edge extensions to intersect in space, but, in fact, the edge extensions do intersect except in certain degenerate cases such as a cubic or conical seed. In the non-degenerative cases, the intersection points of the edge extensions define a unique surface that is generated by an algebraic equation having a maximal order of M-4 where M is defined as the sum of the orders of the surfaces of the seed. For example, assume a seed is bounded by five surfaces, three of which are defined by equations having an order of one and two of which are defined by equations having an order of two. In such case, the seed would have an order of seven $(1+1+1+2+2)$ and M would be equal to seven. For such seed, the intersecting points would define a unique adjoint surface which is defined by an equation having a maximal order of M-4 which would be three. This unique adjoint surface would include all of the intersection points and all of the points in the adjoint surface may be determined by solving the aforementioned equation having an order of three.

Thus, in summary, the sculpture is formed by defining and forming a seed in space, positioning rods extending outwardly from the seed along edge extensions and forming an adjoint surface portion which is disposed on an adjoint surface that is defined by the edge extension intersection points and an algebraic equation having a maximal order of M-4. In the preferred embodiment, the seed and the adjoint surface are connected together by rods extending along the edge extensions of the seed.

BRIEF DESCRIPTION OF THE DRAWINGS

The present invention may best be understood by reference to the following Detailed Description of one embodiment of the invention when considered in conjunction with the Drawings in which.

DETAILED DESCRIPTION

Figure 1:
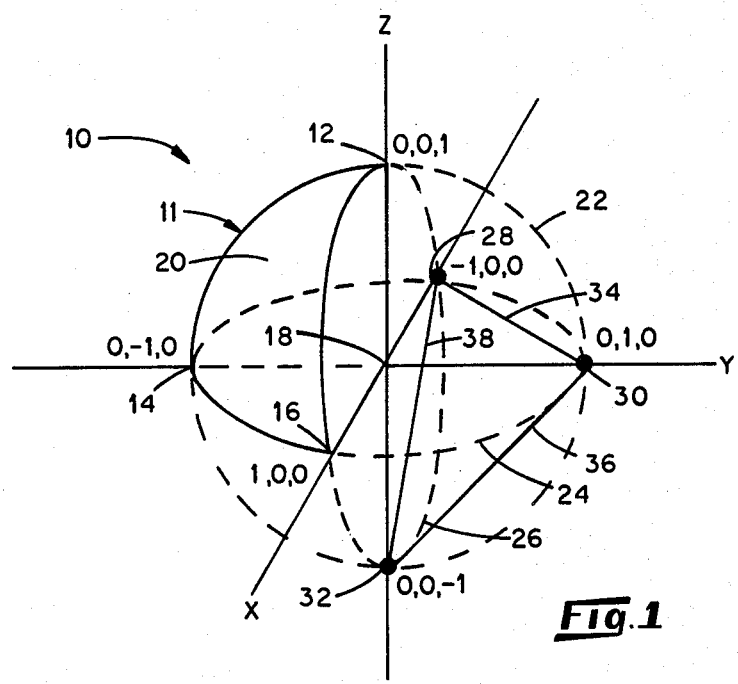
FIG. 1 is a three-dimensional representation of a seed, rod extensions and an adjoint surface.

Referring now to the Drawings in which like reference characters designate like or corresponding parts throughout the several views, there is shown in FIG. 1 a polypol 10. In this embodiment, a seed 11 is defined by the points 12, 14, 16, 18 and the surfaces between them. In FIG. 1, the drawing is shown on the Cartesian coordinates (X, Y, Z), and the Cartesian coordinates for points 12, 14, 16 and 18 are: (0, 0, 1), (0, −1, 0), (1, 0, 0) and (0, 0, 0), respectively. This seed 11 is bounded by three planar surfaces and for convenience of illustration, each of these planar surfaces is aligned on the Cartesian coordinate axes. The plane defined by points 12, 14 and 18 is the Z-Y plane; the plane defined by points 12, 16 and 18 is the X-Y plane; and the plane defined by points 14, 16 and 18 is the X-Y plane. The fourth surface of the seed 11, surface 20, is a spherical surface bounded on three sides by three circular edges. That is, the spherical surface 20 is bounded by a first circular arc that extends from point 12 to point 14 and lies in the Z-Y plane, a second circular arc that extends from point 14 to point 16 and lies in the X-Y plane, and a third circular arc that extends from point 12 to point 16 that lies in the Z-X plane. These three circular arcs and the Cartesian coordinates represent the edges of the seed 11. The dashed line 22 depicts an edge extension of the arc extending between points 12 and 14. Thus, the edge extension 22 is a circular arc lying the Y-Z plane. Likewise, the edge extension of the arc between points 14 and 16 is represented by dashed line 24 and is a circular arc lying in the Y-X plane. Finally, the edge extension of the arc lying between points 12 and 16 is a circular arc 26 lying in the X-Z plane. The remaining edge extensions are the X-Y-Z Cartesian coordinates. That is, since all of the linear edges of the seed lie on the X-Y-Z coordinates, these coordinates constitute the edge extensions of the linear edges of the seed 20. The edge extensions intersect at three points as follows: point 28 ($-1, 0, 0$), point 30 ($0, 1, 0$) and point 32 ($0, 0, -1$). Since the seed 11 has three planar faces (an order of one) and one spherical face (an order of two), the order of the seed 11 is five ($1+1+1+2$). As discussed above, the points of intersection of the edge extensions of the seed 11 will define a unique surface, called an adjoint surface, having a maximal order of $M-4$ where M is the order of the seed. In this case, $M=5$ and the order of the adjoint surface must be no greater than one. Thus, the adjoint surface must be a plane. As is well known, three points that do not lie on the same line will define only one plane. Since points 28, 30 and 32 are not colinear, they will define a unique plane that is represented in FIG. 1 by the lines 34, 36 and 38 extending between those points.

Figure 2:
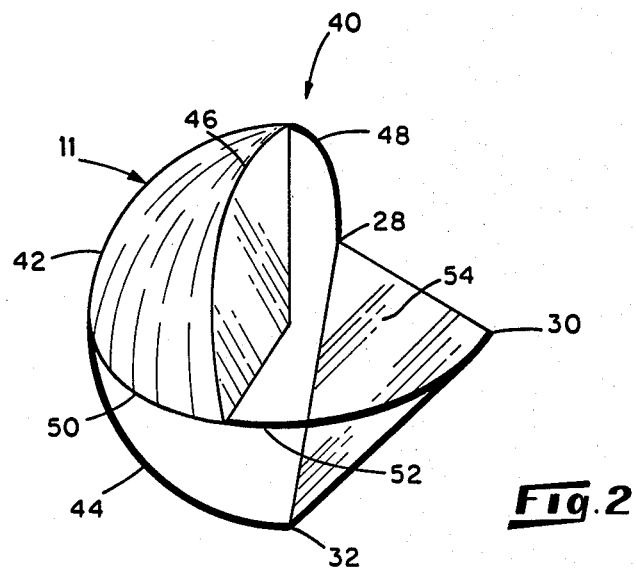
FIG. 2 is perspective view of a sculpture designed in accordance with the seed, rod extensions and adjoint surface shown in FIG. 1.

Referring now to FIG. 2, there is shown a sculpture that has been designed and manufactured in accordance with the method of the present invention. In sculpture 40, the seed 11 has been modeled as a solid. The extension of edge 42 has been modeled by curved steel bar 44 and, likewise, the edge extension of edge 46 has been modeled by a steel bar 48 and the extension of edge 50 has been modeled by a curved steel bar 52. The steel bars 44, 48 and 52 are disposed along the edge extensions as shown in FIG. 1, and each bar terminates at intersection points 28, 30 and 32. The adjoint surface 54 is modeled by a triangular surface defined by the intersection points 28, 30 and 32. It will be appreciated that the polypol 10 shown in FIG. 1 could be modeled in numerous different ways. It is not necessary that the seed 11 be modeled as a solid and it is not necessary to model every rod extension. Likewise, since a plane is infinite, it is necessary to limit the extension of the adjoint surface 54 defined by the intersection points 28, 30 and 32. In this case, it was convenient and aesthetic to limit the adjoint surface 54 to a triangular plane. Also, it will be noted that sculpture 40 does not include rods along every edge extension. In fact, none of the Cartesian coordinate edge extensions are modeled but, of course, they could have been. The exact choice of modeling is not considered critical to the invention, so long as they seed is modeled, at least some of the edge extensions are modeled, and a portion of the adjoint surface is modeled.

In this particular case, shown in FIGS. 1 and 2, it was algebraically very simple to calculate the intersection points of the edge extensions, and since the order of the adjoint surface was "1" indicating that it was a plane, it was very simple to determine the unique adjoint surface of order "1" that contained in intersection points.

It will be appreciated that when more complicated seeds of orders higher than five are used, a more complex algebraic problem is presented. However, calculating the intersection points of the edge extensions will still be a rather straight forward problem of solving algebraic equations to find common points.

The mathematical process of defining the adjoint surface with an algebraic equation is somewhat more complicated than locating the intersection points. The manner in which the adjoint surface is defined algebraically is beyond the scope of the present invention. That is, the mathematics used to define the adjoint surface are known and are not considered part of the invention. A book authored by the present inventor entitled "A Rational Finite Element Basis" by Eugene L. Wachspress, published by Academic Press, Inc., in 1975 (Library of Congress Number TA-347.F5W3 519.4 75-12594) describes a method of determining the unique adjoint surface having an order of M-4 that includes the intersection points.

Although a particular embodiment of the present invention has been described above, it will be appreciated that the invention is capable of numerous rearrangements and modifications without departing from the scope of the invention as defined by the appended claims.

What is claimed is:

1. A method of constructing a sculpture comprising:
   defining a seed having a plurality of algebraic surfaces bounding a volume in space in which the sum (M) of the orders of the surfaces is five or greater and having edges that are defined by the intersections of the algebraic surfaces forming the seed;
   physically modeling the seed to produce a seed model;
   extending into space the edges of the seed model to define edge extensions in space beyond the seed;
   determining all intersection points at which edge extensions intersect in space;
   extending at least one rod from the seed model and disposing it along at least one of the edge extensions for at least a portion of the edge extension lengths;
   defining a unique algebraic adjoint surface having a maximal order of M-4 and including all of the intersection points; and
   modeling the adjoint surface to produce a physical adjoint surface model representing at least a portion of the adjoint surface.

2. A sculpture comprising:
   a seed having a plurality of algebraic surfaces defining a volume in space and intersecting to form edges;
   said algebraic surfaces being definable by algebraic equations in which the sum (M) of the orders of the surfaces is five or greater;
   said edges being definable by algebraic equations that also define edge extensions in space beyond said seed;
   said edge extensions intersecting in space with other edge extensions at a plurality of intersection points;
   at least one rod extending from said seed and being disposed along at least one edge extension for a predetermined distance;
   a unique adjoint surface that is defined by all of the intersection points and an algebraic equation of maximal order M-4; and
   adjoint surface structure extending along at least a portion of the adjoint surface, whereby said seed, at least one rod and adjoint surface structure from the sculpture.

* * * * *